(12) United States Patent
Kimura et al.

(10) Patent No.: US 9,846,027 B2
(45) Date of Patent: Dec. 19, 2017

(54) MEASURING APPARATUS, METHOD, AND PROGRAM

(75) Inventors: Isao Kimura, Kawasaki (JP); Atsushi Takeuchi, Yokohama (JP)

(73) Assignee: NIKON CORPORATION, Tokyo (JP)

(*) Notice: Subject to any disclaimer, the term of this patent is extended or adjusted under 35 U.S.C. 154(b) by 35 days.

(21) Appl. No.: 12/832,539

(22) Filed: Jul. 8, 2010

(65) Prior Publication Data

US 2010/0272321 A1    Oct. 28, 2010

(30) Foreign Application Priority Data

Jan. 9, 2008    (JP) ................................ 2008-002130

(51) Int. Cl.
*G01B 11/02*    (2006.01)
*G02B 21/36*    (2006.01)
*G01B 21/02*    (2006.01)
*G06T 7/60*    (2017.01)

(52) U.S. Cl.
CPC .............. *G01B 11/02* (2013.01); *G01B 21/02* (2013.01); *G02B 21/365* (2013.01); *G06T 7/60* (2013.01); *G06T 2207/10056* (2013.01)

(58) Field of Classification Search
CPC ........... G01B 11/02; G01B 21/02; G06T 7/60; G06T 2207/10056; G02B 21/365
See application file for complete search history.

(56) References Cited

U.S. PATENT DOCUMENTS

| 5,625,457 A | 4/1997 | Ogawa et al. |
| 5,912,699 A * | 6/1999 | Hayenga et al. ............. 348/132 |
| 7,136,518 B2 * | 11/2006 | Griffin ................. A61B 5/0059 |
| | | 345/629 |
| 2002/0018589 A1 | 2/2002 | Beuker et al. |

(Continued)

FOREIGN PATENT DOCUMENTS

| JP | 1-214702 | 8/1989 |
| JP | 05-256623 | 10/1993 |

(Continued)

OTHER PUBLICATIONS

Basic Vector Operations, Georgia State University, http://hyperphysics.phy-astr.gsu.edu/hbase/vect.html, accessed Jun. 25, 2015.*

(Continued)

*Primary Examiner* — Katrina Fujita (57) ABSTRACT

A measuring apparatus, method and program with which a distance between two points that are not within one photographing range can be easily measured is provided. According to an embodiment, a representative point is set in an image in which a start point is set, and the coordinates, of the points and characteristic quantity of a neighborhood image is stored. Hereafter in each image until an end point is set, a representative point of the most recent image is searched, the coordinates thereof are stored, a new representative point is set, the coordinates thereof and the characteristic quantity of the neighborhood image are stored, and the coordinates of the end point are stored. A vector between the respective two (Continued)

points connecting the start point, representative points and the end point in the sequence of setting is calculated, and the distance between the start point and the end point is calculated.

10 Claims, 6 Drawing Sheets

(56) References Cited

U.S. PATENT DOCUMENTS

| | | | |
|---|---|---|---|
| 2007/0065042 A1 | 3/2007 | Vroomen | |
| 2007/0127842 A1* | 6/2007 | Yasuda | G06T 1/0007 382/276 |
| 2007/0274593 A1* | 11/2007 | Tsuneta et al. | 382/192 |
| 2008/0095404 A1* | 4/2008 | Abercrombie | G06K 9/4633 382/104 |
| 2011/0091075 A1* | 4/2011 | Schultz | G01C 11/02 382/106 |

FOREIGN PATENT DOCUMENTS

| | | |
|---|---|---|
| JP | 2004-205366 | 7/2004 |
| JP | 2004-258495 | 9/2004 |
| JP | 2005-003416 | 1/2005 |
| JP | 2005-172667 | 6/2005 |
| WO | 2005/036461 A1 | 4/2005 |

OTHER PUBLICATIONS

Vector Addition, NASA Glenn Research Center, https://www.grc.nasa.gov/www/k-12/airplane/vectadd.html, accessed Jun. 25, 2015.*
International Search Report for PCT/JP2009/050168, dated Mar. 10, 2009.
Chinese Office Action dated Oct. 26, 2011 in corresponding Chinese Application No. 200980104578.9.
Chinese Office Action dated Aug. 3, 2012 in corresponding Chinese Application No. 200980104578.9.
Chinese Office Action dated Apr. 25, 2013 in corresponding Chinese Application No. 200980104578.9.
Japanese Office Action dated Mar. 21, 2013 in corresponding Japanese Application No. 2009-548956.
Extended European Search Report dated Apr. 10, 2017 in corresponding European Patent Application No. 09701312.2.

* cited by examiner

MEASURING APPARATUS, METHOD, AND PROGRAM

CROSS REFERENCE TO RELATED APPLICATION

This application claims the benefit under 35 U.S.C. Section 111, of International Application Number PCT/JP2009/050168, filed Jan. 9, 2009, which claimed priority to Japanese application Number 2008-002130, filed Jan. 9, 2008, the contents of which are incorporated herein by reference.

TECHNICAL FIELD

The present invention relates to a measuring apparatus, method and program, and more particularly to a measuring apparatus, method and program with which a distance between two points that are not within one photographing range can be measured.

BACKGROUND ART

There have been an imaging device, such as a digital camera, which can be connected to a microscope so as to measure a distance between two points on the photographed digital image. In the case of such a conventional imaging device, however, only a distance between two points existing in a same photographic field of view (hereafter also called "photographing range") can be measured, therefore a dedicated apparatus, such as a measuring microscope and a range finder, is used for measuring a distance between two points that are not within one photographing range (e.g. see Patent Document 1).
[Patent Document 1] Patent No. 3652014

Such a dedicated apparatus, however, is expensive, and a simple means for measuring a distance between two points that are not within one photographing range is demanded for a microscope other than a measuring microscope.

DISCLOSURE OF THE INVENTION

With the foregoing in view, it is an object of the present invention to provide means for measuring a distance between two points that are not within one photographing range.

A measuring apparatus according to a first aspect of the present invention is a measuring apparatus for measuring a distance between two points of a start point and an end point, using a plurality of images photographed while shifting a photographing range of a measurement target, comprising: coordinate calculation means for calculating coordinates of the start point in an image in which the start point is set, and coordinates of the end point in an image in which the end point is set, and storing the calculated coordinates in a storage unit; representative point setting means for setting a representative point in the image in which the start point is set, at the position of coordinates that are different from those of the start point, storing the coordinates of the representative point and characteristic quantity of a neighborhood image, searching the representative point that is set most recently in each image after the image in which the start point is set to the image in which the end point is set, setting a new representative point at the position of coordinates that are different from the coordinates of the detected representative point, and storing the coordinates of the new representative point and characteristic quantity of the neighborhood image in the storage unit; representative point searching means for searching the representative point in each image from the image in which the start point is set to the image in which the end point is set, based on the characteristic quantity of the neighborhood image of the representative point that is set most recently, and storing the coordinates of the detected representative point in the storage unit; vector calculation means for calculating a vector between two points in a same image respectively, for the start point and the representative point in the image in which the start point is set, for the representative points which are set at different positions in a same image, and for the representative point and the end point in the image in which the end point is set, using the stored coordinates of the start point, the representative points and the end point; and distance calculation means for calculating a distance between the start point and the end point based on the vector from the start point to the end point, that is determined by adding all the calculated vectors.

A measuring method according to the first aspect of the present invention is a measuring method for measuring a distance between two points of a start point and an end point, using a plurality of images photographed while shifting a photographing range of a measurement target, comprising: a start point coordinate obtaining step of obtaining coordinates of the start point in an image in which the start point is set; a first representative point setting step of setting, in the image in which the start point is set, a representative point which is different from the start point, and obtaining the coordinates of the representative point which is set and characteristic quantity of a neighborhood image; a representative point searching step of searching the representative point in each image from the image in which the start point is set to the image in which the end point is set, based on the characteristic quantity of the neighborhood image of the representative point that is set most recently, and obtaining the coordinates of the representative point that is set most recently; a second representative point setting step of setting a new representative point at the position of coordinates that are different from the coordinates of the representative point detected in the representative point searching step, and obtaining the coordinates of the new representative point and the characteristic quantity of the neighborhood image; an end point coordinate obtaining step of obtaining coordinates of the end point in the image in which the end point is set; a vector calculation step of calculating a vector between two points in a same image respectively, for the start point and the representative point in the image in which the start point is set, for the representative points which are set at different positions in the same image, and for the representative point and the end point in the image in which the end point is set, using the obtained coordinates of the start point, the representative points and the end point; and a distance calculation step of calculating a distance between the start point and the end point based on the vector from the start point to the end point that is determined by adding all the calculated vectors.

A program according to the first aspect of the present invention is a program for causing a computer to execute a processing for measuring a distance between two points of a start point and an end point, using a plurality of images photographed while shifting a photographing range of a measurement target, the program causing the computer to execute the processing comprising: a start point coordinate obtaining step of obtaining coordinates of the start point in an image in which the start point is set; a first representative point setting step of setting, in the image in which the start point is set, a representative point which is different from the start point, and obtaining the coordinates of the representative point which is set and characteristic quantity of a neighborhood image; a representative point searching step of searching the representative point in each image from the image in which the start point is set to the image in which the end point is set, based on the characteristic quantity of the neighborhood image of the representative point that is set most recently, and obtaining the coordinates of the representative point that is set most recently; a second representative point setting step of setting a new representative point at the position of coordinates that are different from the coordinates of the representative point detected in the representative point searching step, and obtaining the coordinates of the new representative point and the characteristic quantity of the neighborhood image; an end point coordinate obtaining step of obtaining coordinates of the end point in the image in which the end point is set; a vector calculation step of calculating a vector between two points in a same image respectively, for the start point and the representative point in the image in which the start point is set, for the representative points which are set at different positions in the same image, and for the representative point and the end point in the image in which the end point is set, using the obtained coordinates of the start point, the representative points and the end point; and a distance calculation step of calculating a distance between the start point and the end point based on the vector from the start point to the end point that is determined by adding all the calculated vectors.

A measuring apparatus according to a second aspect of the present invention is a measuring apparatus for measuring a distance between two different points on a subject surface, comprising: an image forming optical system for forming an image of the subject surface; imaging means for picking up an image formed by the image forming optical system; control means for obtaining at least a photographed image including one of the two different points and a photographed image including the other of the points while relatively shifting the imaging means with respect to the subject surface from the one to the other of the two points, and controlling the imaging means so that a part of areas of the photographed images picked up by the imaging means overlap; setting means for setting a representative point for measuring a distance in the overlapped area, out of the respective photographed images; and calculation means for determining, from each of the photographed images, the difference of coordinates between two points out of the one point, the other point and the representative point existing in each of the photographed images, and calculating a distance between the two points using the difference of the coordinates determined for each of the photographed images.

According to the first aspect of the present invention, coordinates of a start point in an image in which the start point is set are stored, a representative point which is different from the start point is set in the image in which the start point is set, coordinates of the representative point which is set and characteristic quantity of the neighborhood image are stored, the representative point is searched using the characteristic quantity of the neighborhood image of the representative point that is set most recently in the respective images from the image in which the start point is set to the image in which the end point is set, coordinates of the dedicated representative point are stored and a new representative point is set, the coordinates of the new representative point and characteristic quantity of the neighborhood image are stored, coordinates of the end point in the image in which the end point is set are stored, a vector between the respective two points connecting two points out of the start point, the representative points and the end point is calculated for each image using the stored coordinates of the start point, the representative points and the end point, and the distance between the start point and the end point is calculated based on the vector from the start point to the end point, which is determined by adding all the calculated vectors.

According to the second aspect of the present invention, an image formed by the image forming optical system is picked up, at least a photographed image including one of the two different points on the subject surface and a photographed image including the other of the points are obtained while relatively shifting the imaging means with respect to the subject surface from the one point to the other point, the imaging means is controlled so that a part of areas of the photographed images picked up by the imaging means overlap, a representative point for measuring a distance is set in the overlapped area, out of the respective photographed images, the difference of coordinates between two points out of the one point, the other point and the representative point existing in each of the photographed images is determined from each of the photographed images, and a distance between the two points is calculated using the difference of the coordinates determined for each of the photographed images.

According to the first aspect or second aspect of the present invention, a distance between two points that are not within one photographing range can be measured.

EXPLANATION OF REFERENCE NUMERALS 1 measuring system
11 microscope
12 camera head
13 camera control unit
42 image processing circuit
43 specified position address calculation circuit
44 representative point setting circuit
45 representative point searching circuit
47 CPU
48 storage circuit
49 measurement result notification circuit
50 display element
61 vector calculation unit
62 distance calculation unit
63 control unit

BEST MODE FOR CARRYING OUT THE INVENTION

Embodiments of the present invention will now be described with reference to the drawings.

Figure 1:
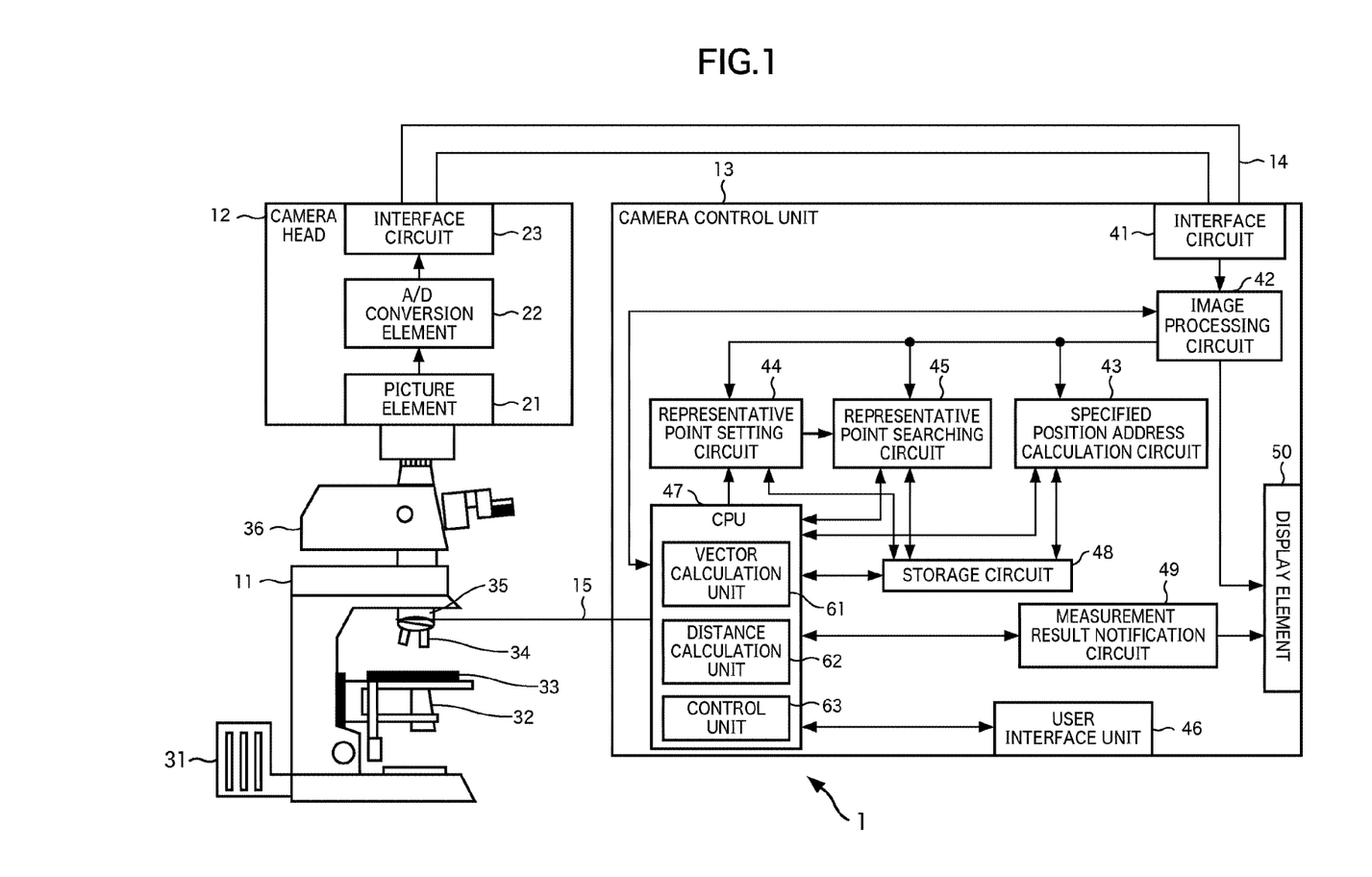
FIG. 1 is a block diagram depicting an embodiment of a measuring system to which the present invention is applied.

FIG. 1 is a diagram depicting an embodiment of a measuring system to which the present invention is applied. A measuring system 1 in FIG. 1 is a system that can measure a distance between two points in a measurement target which is set on a stage 33 of a microscope 11 constituted by a standard observation microscope which is different from a measuring microscope. In the measuring system 1, a camera head 12 is installed on the microscope 11 so that the imaging surface of a picture element 21 becomes approximately parallel with the image formation surface in the optical system of the microscope 11, and an interface circuit 23 of the camera head 12 is connected to an interface circuit 41 of a camera control unit 13 via a camera interface cable 14. A revolver 35 of the microscope 11, an interface (not illustrated) for providing the formation of the entire microscope 11, and a CPU (Central Processing Unit) 47 of the camera control unit 13 are inter-connected via a cable 15.

The camera head 12 is comprised of the picture element 21 constituted by a CCD (Charge Coupled Device) or CMOS (Complementary Metal Oxide Semiconductor), an A/D (Analog/Digital) conversion element 22, and an interface circuit 23. The camera control unit 13 is comprised of the interface circuit 41, an image processing circuit 42, a specified position address calculation circuit 43, a representative point setting circuit 44, a representative point searching circuit 45, a user interface unit 46 constituted by a mouse, touch panel or key switch, the CPU 47, a storage circuit 48, a measurement result notification circuit 49, and a display element 50 constituted by an LCD (Liquid Crystal Display), for example. The CPU 47 implements the functions of a vector calculation unit 61, distance calculation unit 62 and control unit 63 by executing a predetermined control program.

Now the processing when the measurement target being set on the stage 33 of the microscope 11 is photographed and the photographed image is displayed in the measuring system 1 will be described.

The light emitted from an illumination apparatus 31 of the microscope 11 is irradiated onto the measured target on the stage 33 via a condenser lens 32. An image of the illuminated measurement target is formed on the imaging plane of the picture element 21 of the camera head 12 by an objective lens 34 and an image forming optical system, which is not illustrated, in a lens barrel unit 36. The image of the measurement target is converted into an electric photographing signal by the picture element 21, and is converted into a digital photographing signal by the A/D conversion element 22, and is then transferred to the camera control unit 13 via the interface circuit 23 and the camera interface cable 14.

The digital photographing signal which is transferred to the camera control unit 13 is received by the interface circuit 41, and is supplied to the image processing circuit 42. The image processing circuit 42 executes a predetermined image processing on the digital photographing signal based on the control by the control unit 63, and generates a digital image signal. The image processing circuit 42 performs, for example, pixel interpolation processing so that an individual pixel has three data of red, green and blue if the camera head 12 supports colors, or a color balance processing among the red, green and blue data. The image processing circuit 42 also performs pixel defect correction processing, filter processing and contour enhancement processing, for example, when necessary.

The image processing circuit 42 supplies the generated digital image signal to the specified position address calculation circuit 43, representative point setting circuit 44, representative point searching circuit 45 and display element 50. The display element 50 displays an image based on the digital image signal that is supplied from the image processing circuit 42. Hereafter an image based on the digital image signal is also simply called an "image".

In the measuring system 1, the above photographing processing and display processing are repeatedly executed at a predetermined frame rate, and a plurality of images photographed by the camera head 12 are displayed on the display element 50 of the camera control unit 13.

The stage 33 of the microscope 11 can be moved in the lateral direction (x direction, direction perpendicular to the page face in FIG. 1 (direction penetrating the page face from top to bottom)), longitudinal direction (y direction, lateral direction on the page face in FIG. 1), and vertical direction (z direction, longitudinal direction on the page face in FIG. 1) of the microscope 11. By moving the stage 33 in the lateral direction, the photographing range of the measurement target on the stage 33 by the camera head 12 moves in the lateral direction (x direction), and by moving the stage 33 in the longitudinal direction, the photographing range of the measurement target on the stage 33 by the camera head 12 moves in the longitudinal direction (y direction).

Figure 2:
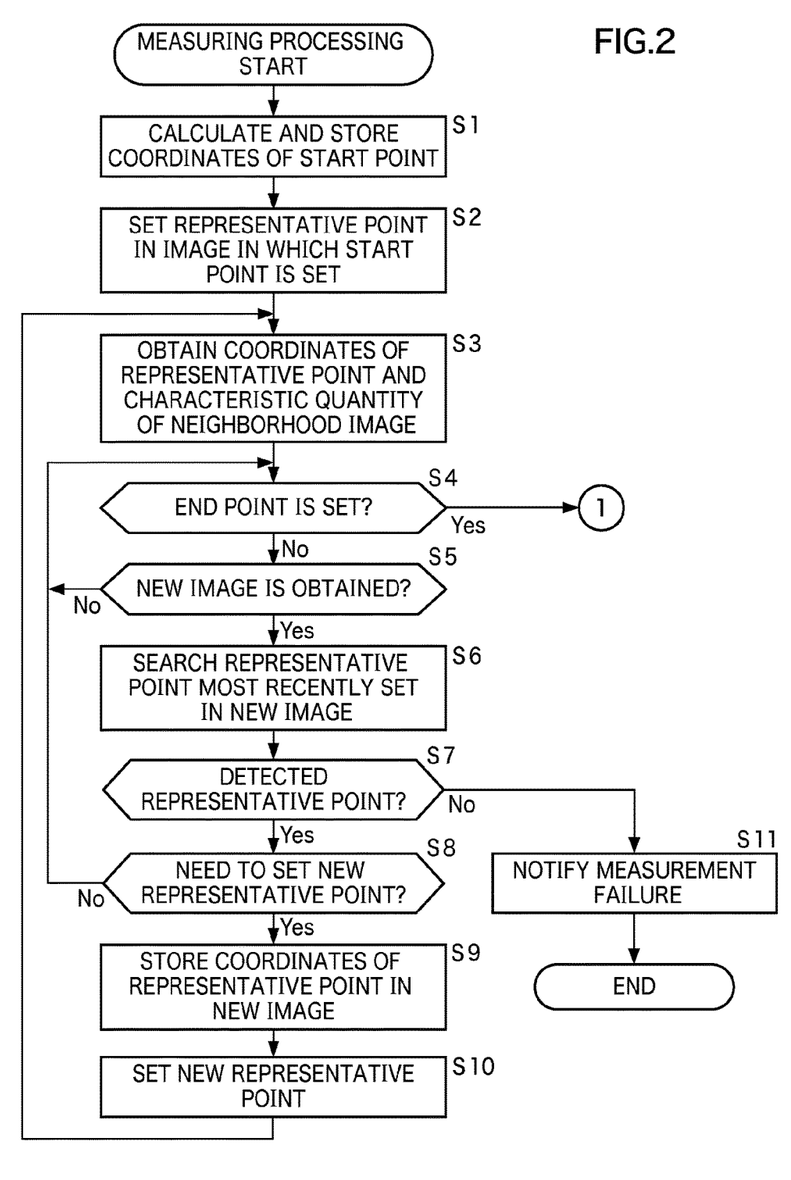
FIG. 2 is a flow chart depicting a measuring processing executed by the measuring system.
Figure 3:
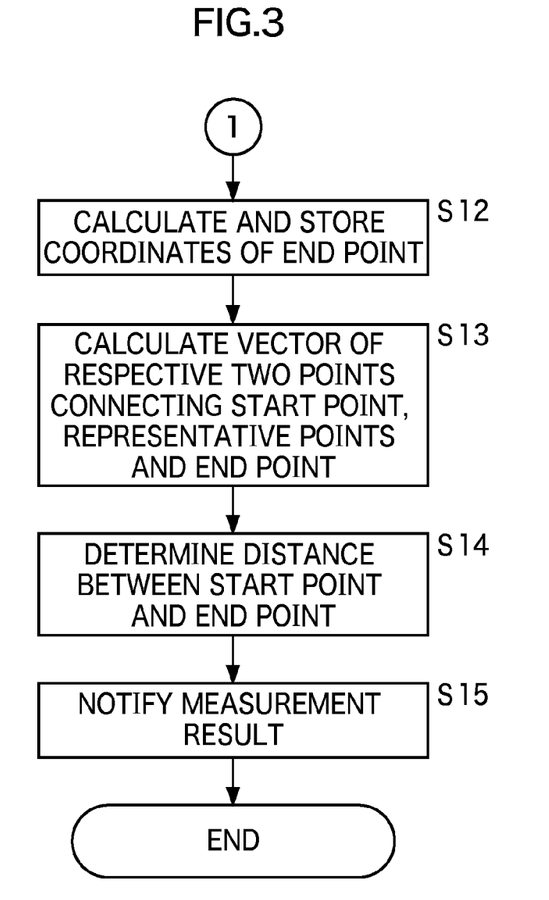
FIG. 3 is a flow chart depicting a measuring processing executed by the measuring system.

Now the measuring processing executed by the measuring system 1 will be described according to the flow charts in FIG. 2 and FIG. 3 with reference to FIG. 4 to FIG. 8.

To measure a distance between two points of the measurement object on the stage 33 of the microscope 11 using the measuring system 1, the user moves the stage 33 of the microscope 11 while viewing the image displayed on the display element 50, and sets the start point of the distance to be measured, via the user interface unit 46. And when the information to indicate the position of the start point, which is set by the user, is supplied from the user interface unit 46 to the control unit 63, this measuring processing is started.

Figure 4:
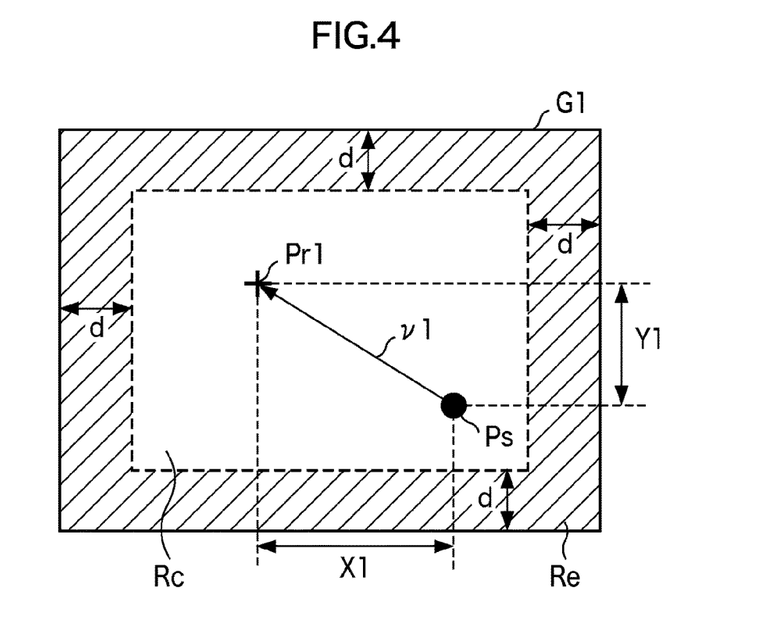
FIG. 4 is a diagram depicting an example of the measuring processing.

For example, this measuring processing is started when the start point Ps is set while the image G1 in FIG. 4 is displayed on the display element 50, and the information to indicate the position of the start point Ps is supplied from the user interface unit 46 to the control unit 63. In FIG. 4 and the later mentioned FIG. 5 to FIG. 7, only a range of the image that is photographed by the camera head 12 and displayed on the display element 50 is shown, where the dots and shaded portion are merely for assisting explanation, and are not in the actual photographed and displayed image.

In step S1, the specified position address calculation circuit 43 calculates the coordinates of the start point in the coordinate system in the image currently obtained, and stores the result. In concrete terms, the control unit 63 of the CPU 47 supplies the information to indicate the position of the start point set by the user to the specified position address calculation circuit 43. The specified position address calculation circuit 43 calculates the coordinates of the start position in the image in which the start position is set, and has the storage circuit 48 store the result.

In step S2, the representative point setting circuit 44 sets a representative point in the image in which the start point is set, based on the control of the control unit 63. For example, in the image in which the start point is set, a pixel which is in a different position from the start point, where predetermined characteristic quantity is maximum, and is easy to distinguish from other pixels, is set to the representative point. Examples of the characteristic quantity used for setting the representative point are contrast or edge intensity and color information, which are obtained from each pixel and adjacent pixels thereof.

Further, before the representative point extends out of the image in the next frame by movement of the stage 33 of the microscope 11, a representative point is set out of the pixels in the center portion Rc which is a range which is away from the four sides of the image G1 by the distance d (unit is a pixel) as shown in FIG. 4. Here the distance d is calculated by the following Expression (1).

[Expression 1]

$$d = (\text{maximum moving speed (mm/sec.) of stage} \times \text{magnification of objective lens}/(\text{frame rate (fps)} \times \text{pixel pitch (mm)})) \times \alpha \quad (1)$$

In Expression (1), the maximum moving speed of the stage indicates a maximum value of a moving distance of the stage 33 in one second, that can be assumed to be the standard method of use. $\alpha$ denotes a margin ratio and is set to 1.1. In other words, the distance d is a maximum value (assumed value) of the distance that a pixel moves in one frame by moving the stage 33 multiplied by the margin ratio. Therefore as FIG. 4 shows, it becomes less likely for the representative point Pr1 to extend out of the image in the next frame by setting the representative point Pr1 in the center portion Rc of the image G1.

The pixel pitch of the picture element 21 used for Expression (1) is a value uniquely determined by the camera to be used. The frame rate of the camera head 12 is set in the communication control unit 13 by communication with the camera head 12 or the setting by the user.

In step S3, the coordinates of the representative point and characteristic quantity of the neighborhood image are obtained by the representative point setting circuit 44. In the case of the example in FIG. 4, for example, the representative point setting circuit 44 has the storage circuit 48 store the coordinates of the representative point Pr1, and also obtains the pixel value in a predetermined range (e.g. 5×5 pixels) in a predetermined range centering around the representative point Pr1 as the characteristic quantity of the neighborhood image of the representative point Pr1, and has the storage circuit 48 store it. The characteristic quantity of the neighborhood pixels of the representative point is not limited to the pixel values, but a value obtained by performing various filter processings and image transformation processings on the neighborhood pixels of the representative point may be used.

In step S4, the control unit 63 determines whether the end point is set. If it is determined that the end point is not set, the processing advances to step S5.

In step S5, the control unit 63 determines whether a new image in a different photographing range is obtained. If it is determined that a new image is not obtained, the processing returns to step S4, and the processings in step S4 and step S5 are repeatedly executed until it is determined that the end point is set in step S4, or until it is determined that a new image is obtained in step S5.

If it is determined that a new image in a different photographing range is obtained in step S5, on the other hand, the processing advances to step S6.

In step S6, the representative point searching circuit 45 searches a representative point that is most recently set in a new image based on control by the control unit 63. In concrete terms, the representative point searching circuit 45 reads the characteristic quantity of the neighborhood image of the representative point that is set most recently that is stored in the storage circuit 48. The representative point searching circuit 45 searches an area where similarity with the read characteristic quantity is maximum and is more than a predetermined threshold, in the new image using such a method as pattern matching. In other words, in the new image, the representative point searching circuit 45 searches an area, which is similar to the neighborhood image of the representative point in the image in which the representative point is set.

In step S7, the representative point searching circuit 45 determines whether a representative point is found. The representative point searching circuit 45 detects an area, where similarity with the characteristic quantity of the neighborhood image of the representative point is maximum and is more than a predetermined threshold, in a new image, and determines that a representative point is found and processing advances to step S8 if the position of the representative point that is set most recently is specified.

Figure 5:
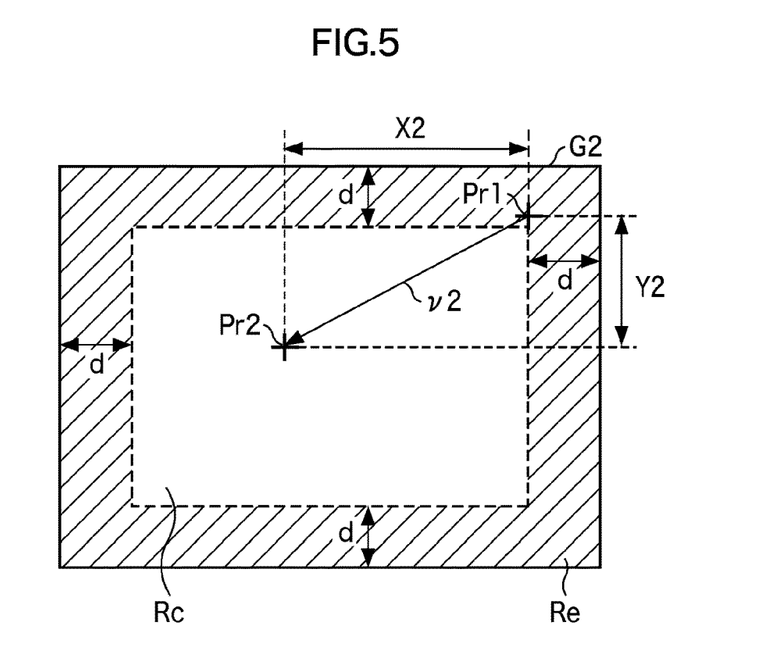
FIG. 5 is a diagram depicting an example of the measuring processing.

In step S8, the control unit 63 determines whether setting a new representative point is necessary. For example, if the representative point Pr1 is detected in the edge Re, which is in a range outside the center portion Rc of the image G2, as shown in FIG. 5, the representative point searching circuit 45 determines that setting a new representative point is necessary, and the processing advances to step S9.

In step S9, the camera control unit 13 stores the coordinates of the representative point in the new image. For example, the representative point searching circuit 45 has the storage circuit 48 store the coordinates of the representative point Pr1 in the image G2.

In step S10, the representative point setting circuit 44 sets a new representative point based on control by the control unit 63. For example, the representative point setting circuit 44 sets a new representative point Pr2 in the center portion Rc in the image G2 by a similar processing as step S2.

Then the processing returns to step S3, and in step S3, the coordinates of the newly set representative point and the characteristic quantity of the neighborhood image are stored in the storage circuit 48. In this way, the representative point that is set most recently is searched in the new image, and the coordinates of the detected representative point are stored, then the new representative point is set, and the coordinates of the newly set representative point and the characteristic quantity of the neighborhood image are stored, whereby the new representative point is set for the new image.

Then the processings in step S3 to step S10 are repeated until it is determined that the end point is set in step S4 or until it is determined that a representative point cannot be found out in step S7.

On the other hand, in step S8, if the representative point searching circuit 45 detects the representative point Pr1 in the center portion Rc of the newly obtained image G2, for example, the control unit 63 determines that setting a new representative point is not necessary, and processing returns to step S4 without performing the processings in step S9 and step S10, and step S4 and subsequent processings are executed. In other words, if the representative point exists in the center portion Rc, a new representative point is not set, but the representative point detected by the representative point searching circuit 45 is continuously used. Thereby the processing time can be decreased and the storage capacity required for storing the coordinates of representative points can be decreased. In the present invention, the processing in step S8 is not always necessary, and this processing in step S8 may be omitted if an increase in the processing times causes any problems.

If it is determined that a representative point is not detected in the newly obtained image in step S7, that is, for example, if a representative point extends out from the image, or if an area, where similarity with the characteristic quantity of a neighborhood image of the representative point is maximum and is more than the predetermined threshold, could not be detected in the new image in step S6 due to the influence of noise or other factors, processing advances to step S11.

In step S11, the measurement result notification circuit 49 notifies the failure of measurement based on control by the control unit 63. For example, the measurement result notification circuit 49 notifies the failure of measuring the distance by displaying a predetermined message or image on the display element 50, or lighting or flashing a lamp, which is not illustrated. Then the measurement process ends.

After setting the start point of a distance to be measured, the user moves the stage 33 of the microscope 11 while viewing the image displayed on the display element 50, and sets the coordinates of the end point of the distance to be measured via the user interface unit 46. When the information to indicate the position of the end point set by the user is supplied from the user interface unit 46 to the control unit 63, it is determined that the end point is set in step S4, and processing advances to step S12.

Figure 6:
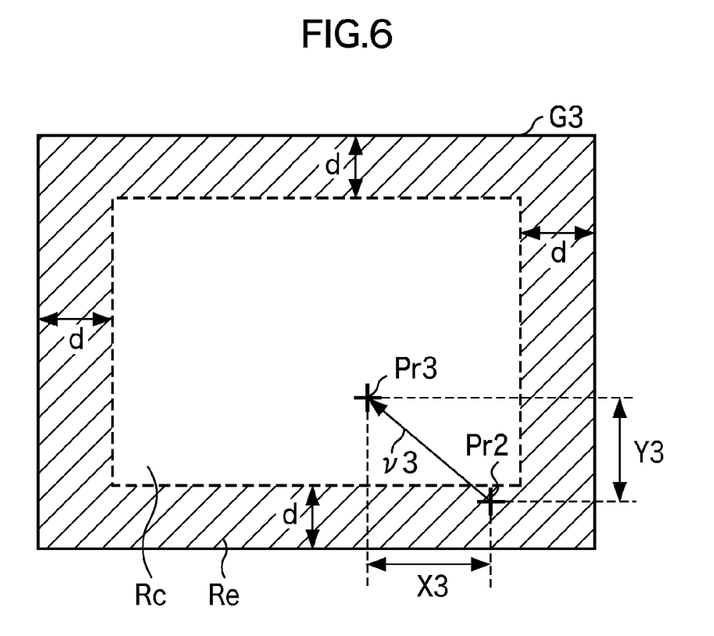
FIG. 6 is a diagram depicting an example of the measuring processing.
Figure 7:
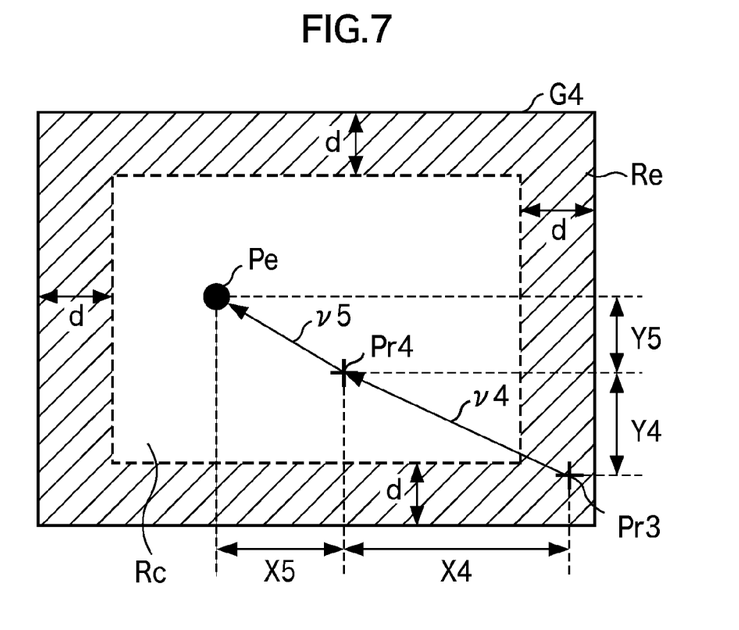
FIG. 7 is a diagram depicting an example of the measuring processing.

Here, the explanation will be made using, as an example, a case in which the representative point Pr2 is detected in the edge portion Re in the image G3 in FIG. 6 after the representative point PR2 is set in the image G2 in FIG. 5 as mentioned above, the representative point Pr3 is newly set, the Pr3 is detected in the edge portion Re in the image G4 in FIG. 7, and the end point Pe is set after the representative point Pr4 is newly detected.

In step S12, the representative point searching circuit 45 detects the representative point that is set most recently in the image in which the end point is set, and stores the coordinates of the representative point.

Also in step S12, the coordinates of the end point are calculated in similar processing as step S1 and stored in the storage circuit 48.

In step S13, the vector calculation unit 61 calculates the vectors between the respective two points using the coordinates of the start point and the representative point which was set when the start point was set, coordinates of the representative point searched and detected in a same image and the newly set representative point in this image, and the coordinates of the representative point which was searched and detected when the end point was set, which are stored in the storage circuit 48. Needless to say, if there are a plurality of images in which searching of the representative point that is set most recently and setting a new representative point were preformed in a same image respectively from the setting of the start point to the end point, the vectors between the representative points searched and detected for a same number of times as the number of images and newly set representative points, are calculated.

To calculate the vectors, the vector v1 (X1, Y1) from the start point Ps to the representative point Pr1 is determined by subtracting the coordinates of the start point Ps from the coordinates of the representative point Pr1 in the image G1 in FIG. 4, for example. In the same way, the vector v2 (X2, Y2) from the representative point Pr1 to the representative point Pr2 is determined by subtracting the coordinates of the representative point Pr1 from the coordinates of the representative point Pr2 in the image G2 in FIG. 5, the vector v3 (X3, Y3) from the representative point Pr2 to the representative point Pr3 is determined by subtracting the coordinates of the representative point Pr2 from the coordinates of the representative point Pr3 in the image G3 in FIG. 6, the vector v4 (X4, Y4) from the representative point Pr3 to the representative point Pr4 is determined by subtracting the coordinates of the representative paint Pr3 from the coordinates of the representative point Pr4 in the image G4 in FIG. 7, and the vector v5 (X5, Y5) from the representative point Pr4 to the end point Pe is determined by subtracting the coordinates of the representative point Pr4 from the coordinates of the end point Pe in the image G4.

In step S14, the distance calculation unit 62 determines the distance between the start point and the end point. The distance between the start point and the end point can be calculated by calculating the total of each vector from the start point to the end point, and the vector from the start point to the end point can be determined by adding all the vectors calculated in step S13.

Figure 8:
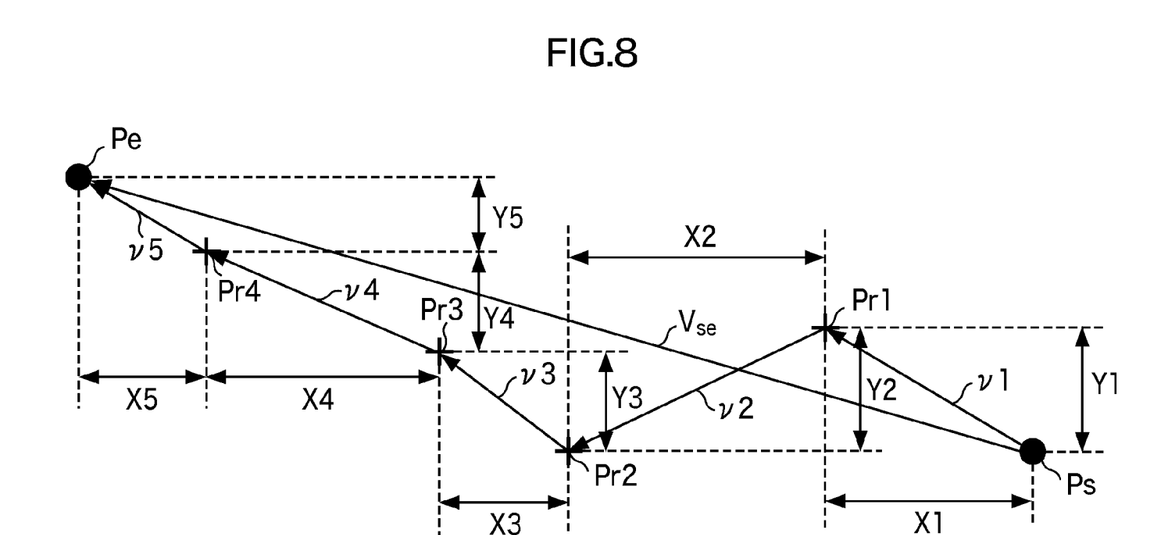
FIG. 8 is a diagram depicting a method for calculating a distance between two points.

For example, as FIG. 8 shows, the vector $V_{se}$ from the start point Ps to the end point Pe can be determined by adding the vectors v1 to v5. Therefore the distance Di (unit: pixel) on the image from the start point Ps to the end point Pe is determined by the following Expression (2).

[Expression 2]

$$Di = |\vec{V_{se}}| = \sqrt{(X1+X2+X3+X4+X5)^2 + (Y1+Y2+Y3+Y4+Y5)^2} \quad (2)$$

The distance Da (unit: mm) between the start point Ps and the end point Pe on the actual measurement target is determined by the following Expression (3).

$$Da = Di \times \text{pixel patch} \div \text{magnification of objective lens} \quad (3)$$

The distance calculation unit 62 obtains the magnification of the objective lens 34 being used for photographing the measurement target by obtaining the setting position of the revolver 35 via the cable 15, for example. The user may set the magnification of the objective lens 34 being used for photographing the measurement target in the distance calculation unit 62.

It is also acceptable to specify, to the camera control unit 13, a range corresponding to 1 mm in the image photographed by the camera head 12, cause the camera control unit 13 to learn how many pixels correspond to 1 mm, and calculate the actual distance Da by the following Expression (4) using this value (unit: pixels/mm) (hereafter called "calibration value").

$$Da = Di \div \text{calibration value} \quad (4)$$

In step S15, the measurement result notification circuit 49 notifies the measurement result based on the control by the control unit 63. For example, the measurement result notification circuit 49 displays the measured distance between the start point and the end point on the display element 50. Then measurement processing ends.

In this way, the distance between two points that are not within one photographing range can be easily measured merely by connecting the camera head 12 and the camera control unit 13 to the microscope 11.

In the above description, an example of setting a new representative point when a representative point is detected in the edge portion Re of each image was shown, but a new representative point may be set for each frame in images after the image in which the start point is set to the image in which the end point is set, omitting the processing in step S8.

In this case, the processing time and the capacity required for storing the coordinates of the representative points increase, but the probability of a representative point extending out of the image and causing a failure of measurement can be decreased.

The CPU 47 can obtain the operation sate of the microscope 11, such as the moving information of the stage 33, via the cable 15, in addition to the magnification information of the objective lens 34. Therefore in step S8, for example, the control unit 63 may obtain the moving information of the stage 33 from the microscope 11, and determine whether setting a new representative point is required or not based on the quantity of change of the imaging range caused by movement of the stage 33.

The position to set a representative point may be fixed, such as a pixel at the center of each image. Thereby the time required for processing to set a representative point can be decreased. In this case, however, a representative point may be set in a pixel of which contrast or edge intensity is weak, which increases the probability of error in detecting a representative point during search processing.

Further, in the above description, an example of moving the photographing range of the measurement target by moving the stage 33 of the microscope 11 was shown, but the photographing range may be moved by moving the camera head 12 in a direction parallel to the top face of the stage 33.

Also in the above description, an example of measuring the distance between two points was shown, but in the measuring system 1, a vector of two points which are not within one photographing range can be calculated. Hence a positional relationship of three or more points, which are not within one photographing range, can be determined, and for example, the shape of a graphic (e.g. circle) determined by a plurality of points, and the angle between two sides, can be measured.

Further, in the above description, an example of applying the present invention to a system for measuring a distance between two points using a microscope was described, but the present invention can be applied to a device and system measuring the distance between two points which are set on a moving image of a photographed measurement target, regardless whether the measurement target is optically enlarged or reduced.

The above mentioned series of processings may be executed by hardware or software. To execute the series of processings by software, programs constituting the software are installed from a program recording media onto a computer built into dedicated hardware or a general purpose personal computer that can execute various functions by installing various programs.

The programs executed by the computer may be programs in which the processings are performed in a time series according to the sequence explained in the present description, or may be programs in which the processings are performed in parallel, or at a required timing, such as when called up.

In the present description, the term "system" refers to a complete device that is constituted by a plurality of apparatuses and means.

Embodiments of the present invention are not limited to the above mentioned embodiments, but numerous modifications can be made without departing from the spirit and scope of the invention.

The invention claimed is:

1. A measuring apparatus to measure a distance between two points, comprising:
at least one processing unit to execute:
setting a representative point at a different position from a start point in a first image in which the start point is set;
executing a process until an end point is set to measure a distance from the start point to the end point, the end point being positioned outside the first image while a field of view of the first image is different than a field of view in which the end point is set,
the process including:
determining whether the end point is set;
obtaining a second image while determining the end point is not set, the second image obtained being unrelated to a position of the representative point set in the first image and the second image including different content than the first image;
searching a representative point that is set most recently in the second image;
setting a new representative point at a different position from a detected representative point as a result of the searching in the second image, the setting being continued while changing the field of view until the determining determines the end point is set;
calculating a vector between two points in a same image, respectively, for the start point and the representative point in the first image, for representative points which are set at different positions in a same image, and when the end point is determined to be set, for the representative point and the end point set; and
measuring the distance between the start point and the end point based on the vector, by adding calculated vectors of the start point, the representative points including the new representative point set according to the result of the searching, and the end point set which is positioned outside the first image.

2. The measuring apparatus according to claim 1, characterized in that
when the representative point is detected outside a predetermined range at a center of the second image, coordinates of the detected representative point is stored in a storage unit, and when the representative point is detected within the predetermined range, the coordinates of the detected representative point is not stored in the storage unit, and
when the representative point is detected outside the predetermined range, the new representative point is set, and when the representative point is detected within the predetermined range, the new representative point is not set.

3. The measuring apparatus according to claim 1, wherein the representative point is set out of pixels within a predetermined range at a center of the second image.

4. The measuring apparatus according to claim 1, wherein a pixel with predetermined characteristic quantity that is large is set, as the representative point.

5. The measuring apparatus according to claim 1, comprising:
notifying failure of the measuring when the searching of the representative point cannot detect the representative point that is set most recently.

6. The measuring apparatus according to claim 1,
wherein the searching of the representative point most recently set in the second image is based on a characteristic quantity of a neighborhood image of the representative point most recently set.

7. A method of measuring a distance between two points, comprising:
  setting a representative point at a different position from a start point in a first image in which the start point is set;
  executing a process until an end point is set to measure a distance from the start point to the end point, the end point being positioned outside the first image while a field of view of the first image is different than a field of view in which the end point is set,
  the process including:
    determining whether the end point is set;
    obtaining a second image while determining the end point is not set, the second image obtained being unrelated to a position of the representative point set in the first image and the second image including different content than the first image;
    searching a representative point that is set most recently in the second image;
    setting a new representative point at a different position from a detected representative point as a result of the searching in the second image, the setting being continued while changing the field of view until the determining determines the end point is set;
    calculating a vector between two points in a same image, respectively, for the start point and the representative point in the first image, for representative points which are set at different positions in the same image, and when the end point is determined to be set, for the representative point and the end point set; and
    measuring the distance between the start point and the end point based on the vector, by adding calculated vectors of the start point, the representative points including the new representative point set according to the result of the searching, and the end point which is positioned outside the first image.

8. The method according to claim 7,
  wherein the searching of the representative point most recently set in the second image is based on a characteristic quantity of a neighborhood image of the representative point most recently set.

9. A non-transitory computer readable medium storing a program that causes a computer to execute a processing including to measure a distance between two points, the processing comprising:
  obtaining coordinates of a start point within a view of a first image in which the start point is set;
  setting, in the first image, a representative point which is different from the start point, and obtaining coordinates of the representative point which is set;
  executing a process until an end point is set to measure a distance from the start point to the end point, the end point being positioned outside the first image while a field of view of the first image is different than a field of view in which the end point is set,
  the process including:
    determining whether the end point is set;
    obtaining a second image while determining the end point is not set, the second image obtained being unrelated to a position of the representative point set in the first image and the second image including different content than the first image;
    searching a representative point that is set most recently in the second image and obtaining coordinates of the representative point that is set most recently;
    setting a new representative point at a different position from a detected representative point as a result of the searching in the second image and obtaining coordinates of the new representative point, the setting being continued while changing the field of view until the determining determines the end point is set;
    obtaining coordinates of the end point in an image in which the end point is set;
    calculating a vector between two points in a same image, respectively, for the start point and the representative point in the first image, for representative points which are set at different positions in the same image, and when the end point is determined to be set, for the representative point and the end point set; and
    measuring the distance between the start point and the end point is based on the vector, by adding calculated vectors of the start point, the representative points including the new representative point set according to the result of the searching, and the end point which is positioned outside the first image.

10. The non-transitory computer readable medium according to claim 9,
  wherein the searching of the representative point most recently set in the second image is based on a characteristic quantity of a neighborhood image of the representative point most recently set.

* * * * *

UNITED STATES PATENT AND TRADEMARK OFFICE
CERTIFICATE OF CORRECTION

PATENT NO. : 9,846,027 B2
APPLICATION NO. : 12/832539
DATED : December 19, 2017
INVENTOR(S) : Isao Kimura et al.

Page 1 of 1

It is certified that error appears in the above-identified patent and that said Letters Patent is hereby corrected as shown below:

On the Title Page

Item [57] (Abstract), Line 34:
Delete "coordinates," and insert -- coordinates -- , therefore.

Signed and Sealed this
Twenty-seventh Day of March, 2018

Andrei Iancu
*Director of the United States Patent and Trademark Office*